(12) United States Patent
Meyerson

(10) Patent No.: US 7,783,605 B2
(45) Date of Patent: Aug. 24, 2010

(54) CALCULATING CLUSTER AVAILABILITY

(75) Inventor: Neal R. Meyerson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 11/322,316

(22) Filed: Dec. 30, 2005

(65) Prior Publication Data
US 2007/0156733 A1    Jul. 5, 2007

(51) Int. Cl.
G06F 7/00      (2006.01)
G06F 17/00     (2006.01)

(52) U.S. Cl. .............................. 707/655; 714/1; 714/37

(58) Field of Classification Search ................ 707/101, 707/655; 714/1, 37
See application file for complete search history.

(56) References Cited

U.S. PATENT DOCUMENTS

| | | | | |
|---|---|---|---|---|
| 5,790,431 | A * | 8/1998 | Ahrens et al. | 718/104 |
| 5,914,879 | A * | 6/1999 | Wang et al. | 700/111 |
| 6,496,948 | B1 * | 12/2002 | Smorodinsky | 714/37 |
| 7,460,549 | B1 * | 12/2008 | Cardei et al. | 370/408 |
| 2004/0098490 | A1 * | 5/2004 | Dinker et al. | 709/229 |
| 2004/0153866 | A1 * | 8/2004 | Guimbellot et al. | 714/47 |
| 2004/0230858 | A1 * | 11/2004 | Susskind | 714/1 |

OTHER PUBLICATIONS

Adi et al., Amit—the situation manager, The VLDB Journal—The International Journal on Very Large Data Bases, vol. 13 Issue 2, May 2004, pp. 177-203, Springer-Verlag New York, Inc.*
"Amit—The Situation Manager", by: Asaf Adi, Published 2003 http://delivery.acm.org/10.1145/990000/988150/40130177.pdf?key1=988150&key2=9515457221&coll=GUIDE&dl=GUIDE&CFID=12446712&CFTOKEN=83505935.*
"Amit—the situation manager", by: Asaf Adi, Published 2003 http://www.springerlink.com/content/nb1qa1d02vvdre00/fulltext.pdf.*

* cited by examiner

Primary Examiner—Apu M Mofiz
Assistant Examiner—Chelcie Daye
(74) Attorney, Agent, or Firm—Vierra Magen Marcus & DeNiro LLP

(57) ABSTRACT

An availability metric is obtained for groups of databases or other computer resources by capturing related stop and start events which are set. Event data, including the stop and start events, can be communicated from agents associated with the databases to a central manager. An availability monitoring server periodically queries the central manager to obtain the stop and start events, and analyzes the event data to determine time periods in which the databases are unavailable. The availability metric can be determined based on a ratio of: (a) a sum of the downtimes of the databases in a given time period and (b) a product of the total number of databases and the time period, e.g., expressed in units of database-minutes. The availability metric can be determined separately for separate clusters of databases and used to provide a service level agreement.

19 Claims, 7 Drawing Sheets

CALCULATING CLUSTER AVAILABILITY

CROSS-REFERENCE TO RELATED APPLICATIONS

This application is related to U.S. patent application Ser. No. 11/323,888, filed Dec. 30, 2005, titled "Determining the Level of Availability of a Computing Resource", (Ref: MS 314776.01), published as US Pub. 2007/0174840, Jul. 26, 2007, and incorporated herein by reference.

BACKGROUND

Computer databases store ever-increasing amounts of data for use by different applications. For example, a data center for a web-based application such as email may employ a number of data storage devices that are geographically distributed. Each location may include a cluster or group of number of storage servers with databases for storing data relating to users' email accounts, such as the text of emails, preferences for displaying emails and so forth. In such large, geographically distributed data centers, or even at a single location, it is important for IT personnel, business managers and others to be able to assess the availability of the databases, such as for setting internal performance goals or service level agreements (SLAs) with outside parties. However, databases may experience downtime due to software upgrades such as patch installations, software hardware failures, maintenance, decommissioning of old hardware, resource balancing, and the like. Currently, the assessment of downtime is a manual, time-consuming task, and the techniques used are often inconsistent and erroneous. As a result, there can be debates over perceived vs. real performance, and resources may be allocated non-optimally.

A solution is needed for assessing the availability of databases or other computer resources in an automated manner which is compatible across different data storage systems, and which provides an accurate basis for setting service level agreements.

SUMMARY

The technology herein, roughly described, provides a technique for assessing the availability of databases or other computer resources in an automated manner.

An operating system or application associated with a cluster or group of databases has the ability to throw events which indicate that a database is available or unavailable. For example, a stop event indicates that a database has stopped and is no longer available for access by an application or other program, and a start event indicates that a previously-unavailable database has started again and is now available. In one aspect, such information relating to the availability of a group of databases is collected and automatically analyzed to determine an overall availability metric. The metric may be a percentage which indicates an uptime or downtime of the group of databases. Uptime represents a time during which a database is available, while downtime represents a time during which a database is unavailable.

In particular, the metric can be derived by determining a sum (S) of the uptimes or downtimes of the individual databases in the group, and a product (P) of the number of databases in the group and a time period during which the metric applies. The product has the units of database-minutes, when the time period is measured in minutes. For example, when S represents the sum of the downtimes of the individual databases in the group, the value $(1-S/P) \times 100\%$ represents the percent uptime of the group as a whole over the specified time period.

In an example implementation, the databases are arranged in a number of clusters, where each cluster includes multiple storage devices such as servers, and an availability metric is determined for each cluster separately. Agent software can be provided at each storage device for communicating event data back to a central manager, which maintains a corresponding database of events. A separate availability monitoring server can periodically query the central manager to obtain specified event data, such as the start and stop events, and perform calculations for obtaining the availability metrics. The metrics can be reported via a user interface, written report, or other approach.

The technique can be extended to provide an assessment of the availability of any hardware or software computer resources.

This summary is provided to introduce a selection of concepts in a simplified form that are further described below in the description. This summary is not intended to identify key features or essential features of the claimed subject matter, nor is it intended to be used to limit the scope of the claimed subject matter.

DETAILED DESCRIPTION

Figure 1:
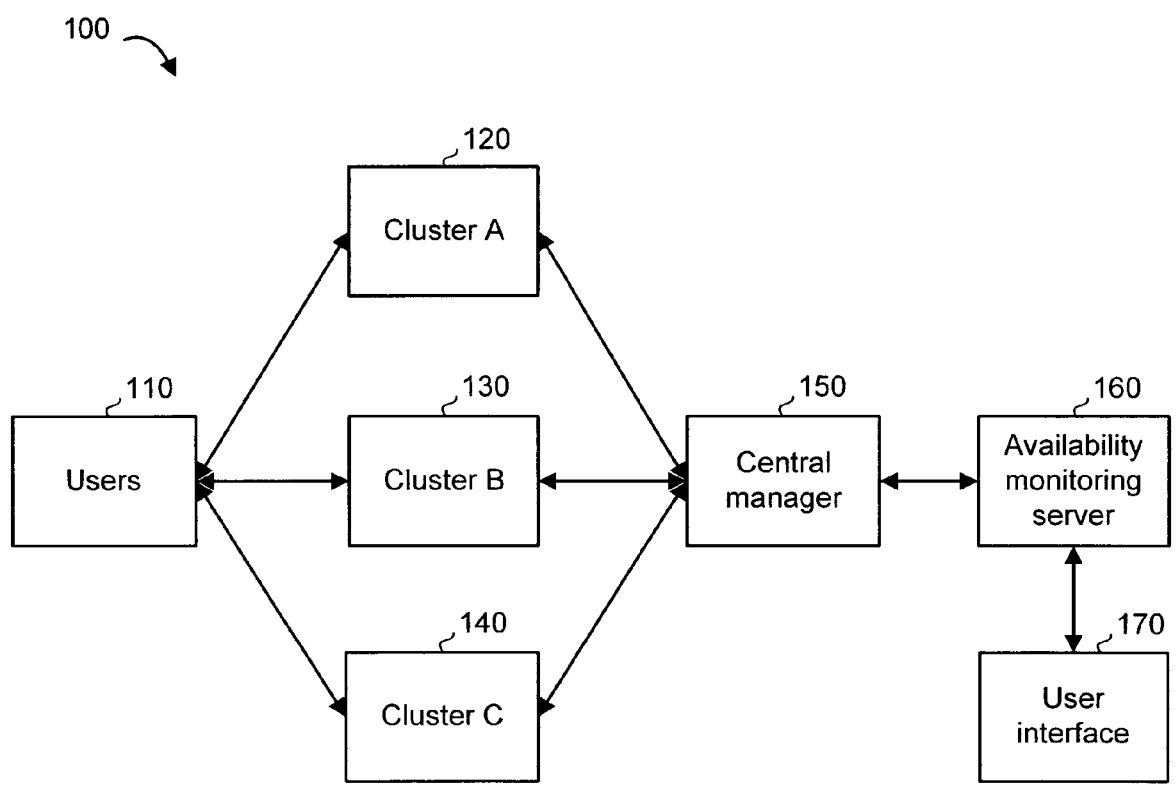
FIG. 1 illustrates a network topology for determining the availability of clusters of databases.

FIG. 1 illustrates a network topology for determining the availability of clusters of databases. The network topology, shown generally at 100, includes example user computers 110 which can communicate with one or more clusters of a data center, such as clusters 120, 130 and 140, each of which includes one or more data storage devices, such as servers with disks for storing data. The user computers 110 can communicate with the clusters via the Internet or other wide area network, a local area network, or any other type of network. In one possible example, the user computers 110 run web browser applications for accessing the Internet via an Internet Service Provider, not shown, and the clusters 120, 130 and 140 may store data for enabling an application such as email. In this case, there may be one or more application servers between the users and the clusters. Or, in an internal network used by an enterprise, the user may communicate directly with the clusters. Typically, the user establishes an account and indicates various preferences regarding the display of the email, how email messages should be handled when received or sent, and so forth. The user may also enter commands for joining distribution lists, uploading digital photos or video to share with friends, and perform various other tasks which require data to be stored. The data of a given account is stored in a database at a cluster so that it can be readily accessed and updated, e.g., when the user accesses the account such as by sending or receiving an email. In the example provided, the data center is distributed in that the clusters 120, 130 and 140 can be geographically remote from one another. However, this is not required. By organizing the data center in clusters, the system can scale to larger numbers of clusters in a predictable way.

In one approach, an availability metric for each cluster is determined locally at the respective cluster, and the metrics may be subsequently communicated to a central manager host 150 for aggregation. In another approach, the clusters 120, 130 and 140 communicate event data, such as database stop and start events, to the central manager 150, and an availability monitoring server 160 periodically queries the central manager 150 to obtain specified event data relating to availability at the clusters. The availability monitoring server 160 uses this event data to calculate an availability metric for each cluster, and reports its results to IT personnel, business managers or other appropriate people via an interface 170, for instance. With this approach, the central manager 150 is relieved of the burden of calculating the availability metrics. However, it is also possible to combine the functionality of the central manager 150 and the availability monitoring server 160 into one host. In one possible implementation, the central manager 150 includes the Microsoft Operations Manager (MOM) 2005 software, which is an event and performance management tool.

Figure 2:
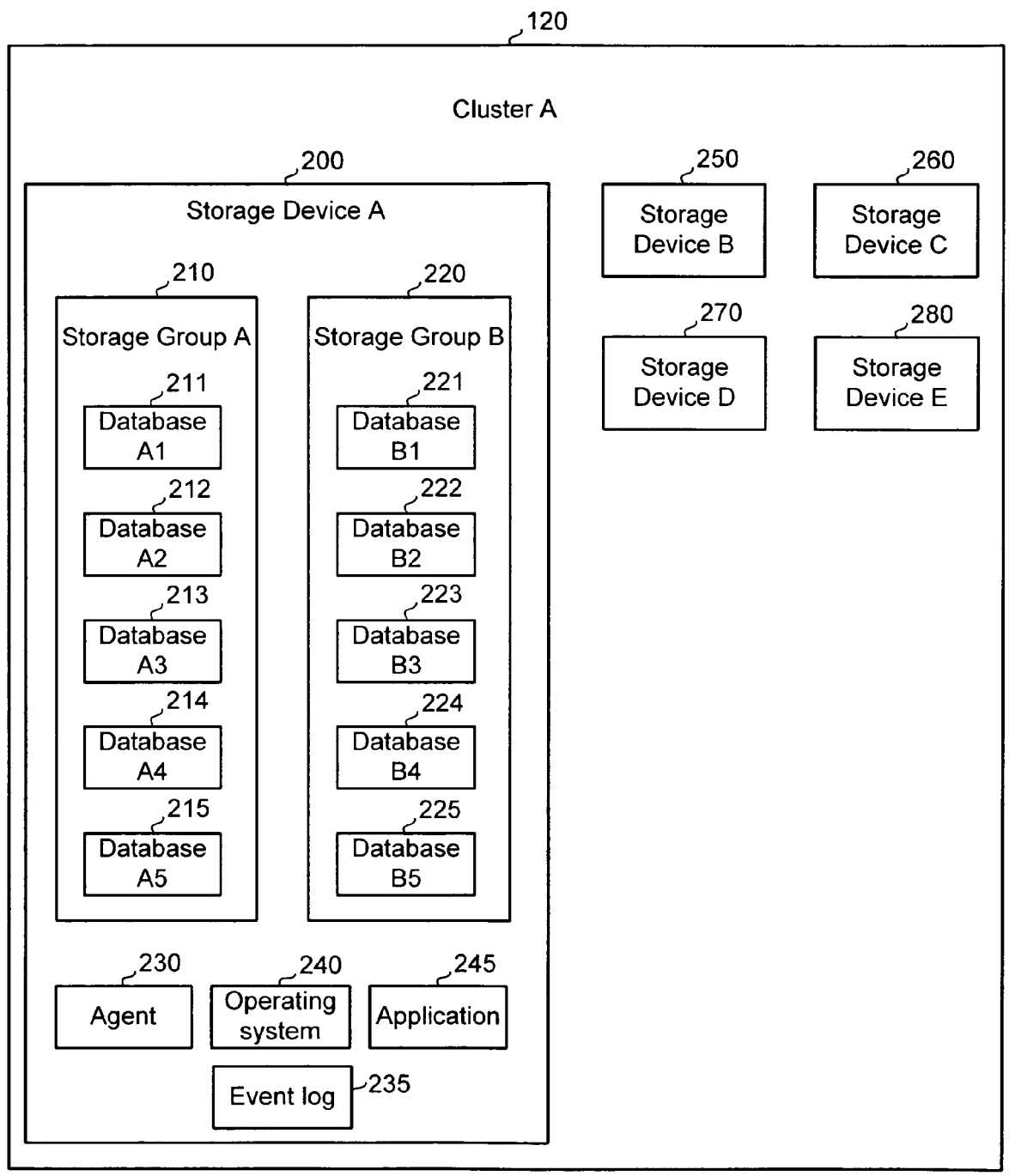
FIG. 2 illustrates a cluster having a number of storage devices with storage groups and databases.

FIG. 2 illustrates a cluster having a number of storage devices with storage groups and databases. Generally, a hierarchy can be defined which includes the data center at the top level, the cluster at the second level, the storage group at the third level and the database at the fourth level. The cluster can include any number of databases arranged on one or more physical storage devices. In particular, cluster A 120 is illustrated as including five storage devices, also referred to as nodes, namely storage devices A (200), B (250), C (260), D (270) and E (280). Storage device A (200) is illustrated in further detail as including a number of storage groups, namely storage groups A (210) and B (220), each of which includes respective databases. Specifically, storage group A (210) includes databases A1 (211), A2 (212), A3 (213), A4 (214) and A5 (215), and storage group B (220) includes databases B1 (221), B2 (222), B3 (223), B4 (224) and B5 (225). The other storage devices, B (250), C (260), D (270) and E (280), may be configured like storage device A (200), in one approach. The configuration shown is an example only as other configurations may be used. Furthermore, each of the storage devices can include agent software 230, an operating system 240 and one or more applications 245 which access the associated databases on the storage device. For example, the storage devices may run software such as Microsoft Exchange Server, which provides messaging and collaboration features, and is designed to interoperate with a software client applications such as Microsoft Outlook, Outlook Express and other e-mail client applications. For an e-mail application, the storage devices may store e-mail mailboxes, e.g., including sent and received e-mail messages. Such e-mail servers can connect to the Internet and private networks where e-mail messages are sent to and received from e-mail users. Microsoft Exchange Server software can run on the Windows Server 2003 operating system.

The operating system 240 and/or the application 245 monitors events at the respective storage device. An event can include any detected action or occurrence at the storage device, including error events, warnings and informational events. When the conditions for setting an event are satisfied, the event is set or thrown by the operating system 240 and/or the application 245. For example, an event can be set when a hardware or software interrupt signal is initiated by hardware or software, respectively, at the storage device. A software interrupt can include a trap or exception. A list of interrupts and associated interrupt handlers can be stored in a table referred to as an interrupt vector table in random access memory (RAM) in the storage device. A list of events can be stored in an event log 235, where each event has an associated unique identifier such as an id number and, optionally, a brief textual description.

Generally, events which relate to the availability of a database, application or other program can be defined. For example, Microsoft Exchange Information Store defines an event #9539 which is set when a database is stopped, and an event #9523 which is set when a database is started. An event #1203 indicates that a cluster is attempting to offline a resource. Thus, it can be concluded that a database has become unavailable, e.g., has gone down or offline, when events #9539 or #1203 are set. Similarly, it can be concluded that a database has become available again, e.g., has come up or online, when event #9523 is set. The specific events discussed are examples only, as other types of events can similarly indicate whether or not a database is available. By analyzing the events which are set by the operating system and/or application associated with a storage device, the availability of a particular database and/or storage device can be monitored. The downtime of a database can be determined as the period between the time at which a first event was set indicating that the database has become unavailable, and the time at which a second event was set indicating that the database has become available again.

In one possible approach, the agent 230 communicates data representing the events at the storage device 200 when the events are set, or at other prescribed times, to the central manager 150 for use in determining an availability metric. Each storage device may include a separate agent, similar to agent 230, which communicates such event data to the central manager 150. The central manager 150 can store the event data, e.g., in an event database, one example of which is the Microsoft Operations Manager (MOM) data warehouse Further information regarding an example computer configuration which can be used for the storage devices 200, 250, 260, 270 and 280, central manager 150, availability monitoring server 160 and interface 170 are provided in FIG. 8, discussed further below.

Figure 3A:
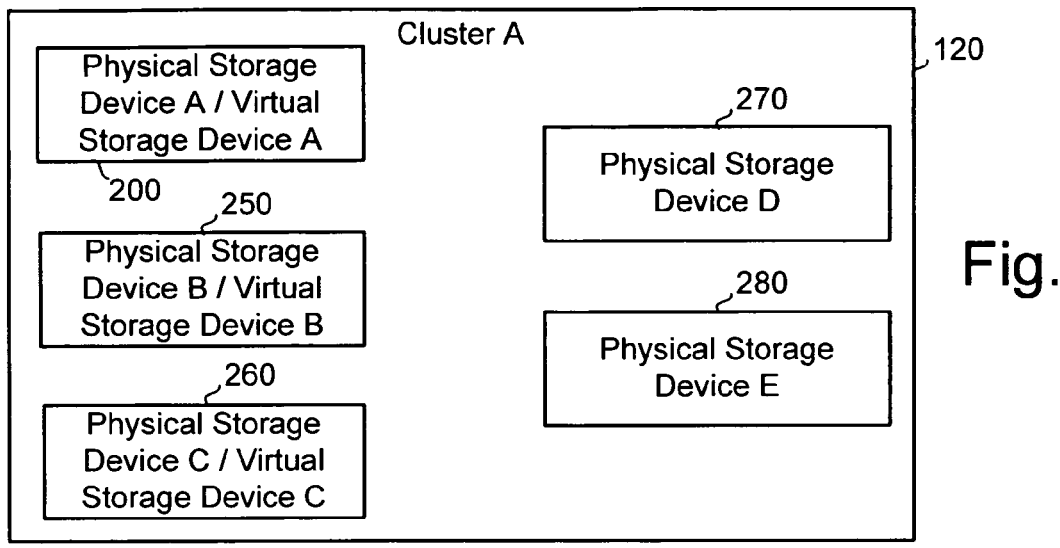
FIG. 3A illustrates a cluster with three active storage devices and two inactive storage devices.
Figure 3B:
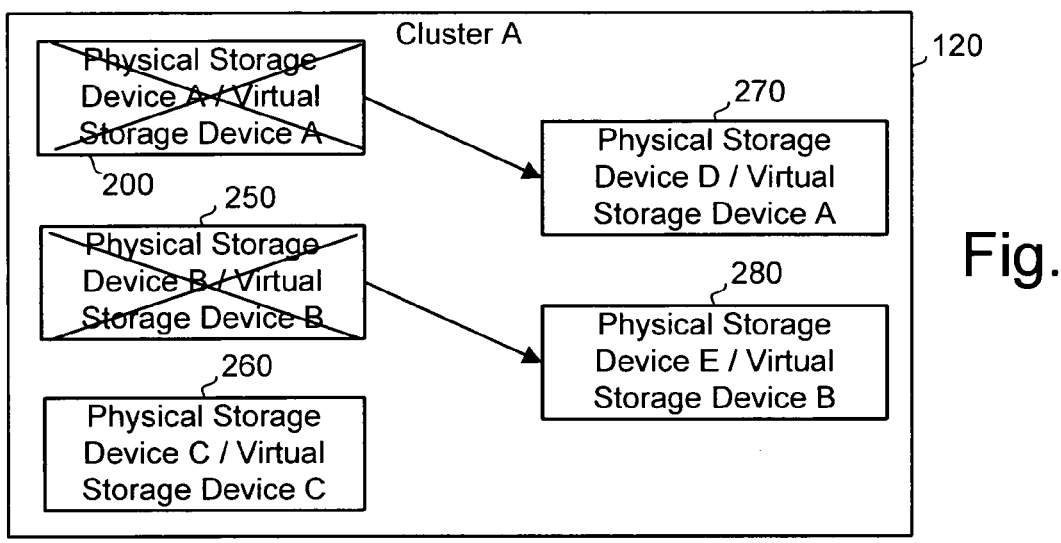
FIG. 3B illustrates the cluster of FIG. 3A where two of the active storage devices become unavailable.
Figure 3C:
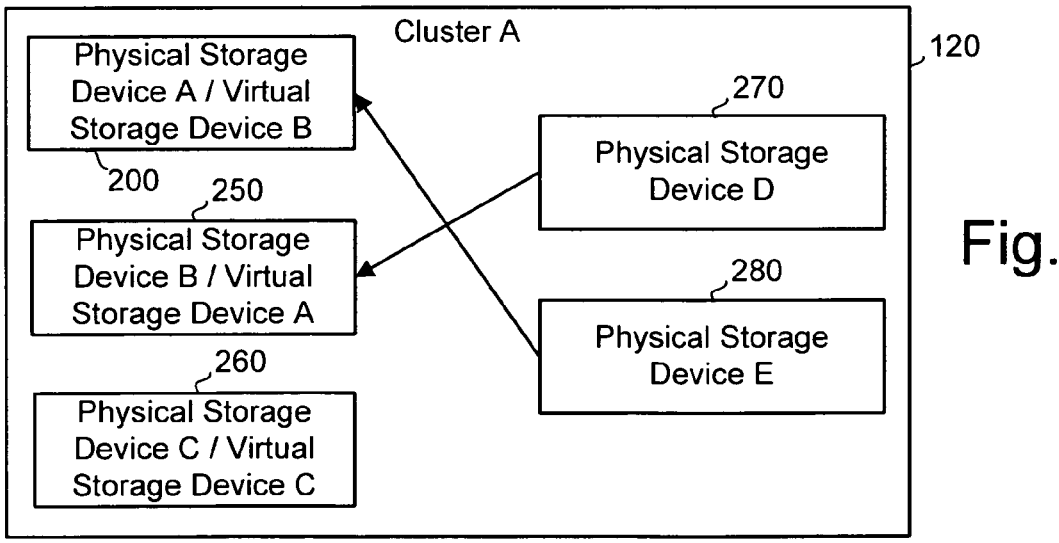
FIG. 3C illustrates the cluster of FIG. 3B where the two storage devices which were unavailable become available again.

FIGS. 3A-3C provide an example scenario in which the databases in a storage device become unavailable, and data from the databases is moved to another storage device in a cluster. FIG. 3A illustrates a cluster with three active storage devices and two inactive storage devices. As discussed in connection with FIG. 2, cluster A (120) includes five storage devices 200, 250, 260, 270 and 280. Generally, a cluster can include both active and inactive/passive storage devices. One or more of the storage devices may be maintained in an inactive state so that it is available to receive data from an active storage device when the active storage device experiences downtime. A distinction may therefore be made between a physical storage device and a virtual storage device, where the virtual storage device represents the data that is stored on a physical storage device, and the same virtual storage device can be provided on different physical storage devices at different times. For example, assume the physical storage devices 200, 250 and 260 are active nodes which store data as respective virtual storage devices, and the physical storage devices 270 and 280 are inactive or passive nodes. Thus, block 200 represents physical storage device A and virtual storage device A, block 250 represents physical storage device B and virtual storage device B, block 260 represents physical storage device C and virtual storage device C, and blocks 270 and 280 represent physical storage devices D and E, respectively. More than one virtual storage device can be provided on one physical storage device as well.

Next, in FIG. 3B, storage devices 200 and 250 become unavailable, e.g., due to a software upgrade or other reason, and their data is transferred to the storage devices 270 and 280, respectively, as indicated by the arrows. In this example, all of the databases in a storage device become unavailable at the same time. However, in other cases, only a subset of the databases on a storage device become unavailable, for instance, when software that only affects the subset of databases is upgraded. At this time, events are set at the storage devices 200 and 250 indicating that the databases in the storage devices 200 and 250 have become unavailable. FIG. 3B illustrates the cluster of FIG. 3A where two of the active storage devices become unavailable. In particular, virtual storage device A is moved to physical storage device D (270), and virtual storage device B is moved to physical storage device E (280). This relocation may occur automatically or under the command of IT personnel, for instance. The databases of the virtual storage devices A and B remain unavailable during the time needed to relocate the databases, e.g., a few minutes. Once the databases have been relocated to the physical storage devices D and E, events are set at the physical storage devices D and E indicating that the databases have become available again.

Next, at FIG. 3C, the storage devices 270 and 280 become available again. In particular, FIG. 3C illustrates the cluster of FIG. 3B where the two storage devices which were unavailable become available again. Note that a virtual storage device need not be moved back to the same physical storage device on which it previously resided. Thus, as shown in FIG. 3C, virtual storage device A is moved to physical storage device B (250), virtual storage device B is moved to physical storage device A (200), and physical storage devices 270 and 280 once again become inactive. At this time, events are set by the storage devices 200 and 250 indicating that the databases in the storage devices 200 and 250 have become available again.

Note that the physical storage devices 200 and 250 can become unavailable or available at the same or different times. Moreover, other scenarios may occur where a database becomes unavailable and is not relocated to another storage device. The database thus remains unavailable until the condition at the storage device which caused its unavailability is resolved.

Figure 4:
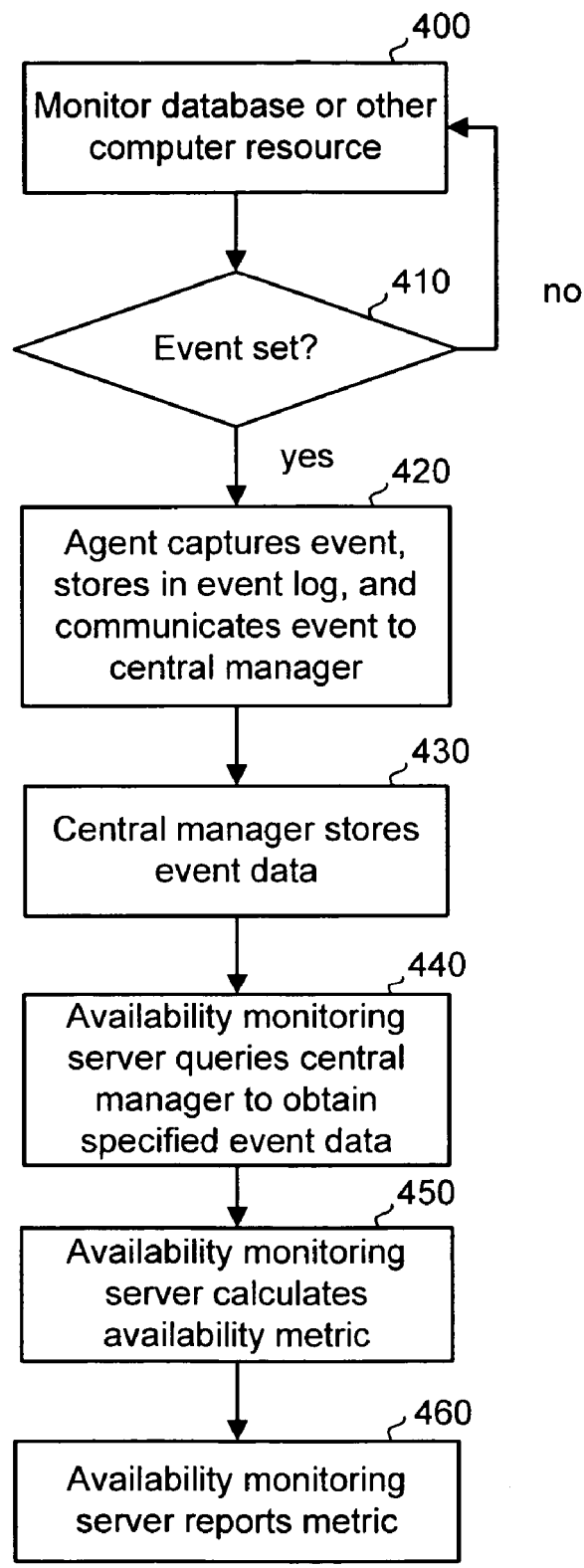
FIG. 4 illustrates a method for providing an availability metric.

FIG. 4 illustrates a method for providing an availability metric. At step 400, a database or other computer resource is monitored, such as by an application or operating system that has the ability to set events. The monitoring application can be part of a program for managing the database, for instance. At step 410, if an event is set, an agent captures the event, stores it in an event log, and subsequently communicates it to the central manager, in one possible approach (step 420). This communication can occur periodically at preset times, for instance. The agent may have the ability to interact with the application or operating system for this purpose. In another approach, the event data is processed locally to determine an availability metric. At step 430, the central manager stores the event data received from one or more clusters. At step 440, an availability monitoring server queries the central manager to obtain specified event data, such as event data that indicates that a database has gone down and is no longer available, or a database has come back up and is available again. For example, the availability monitoring server can query the central manager for events having specified identifiers. The query can include limitations regarding a specified time period, or specified clusters, storage groups or databases, for instance, which are of interest. At step 450, the availability monitoring server calculates an availability metric, as discussed in detail further below. At step 460, the availability monitoring server can report the metric to IT personnel or business managers, for instance, such as via a user interface, as well as storing the data for historical analysis.

The availability metric for one or more databases can be calculated from an uptime or a downtime perspective. These perspectives are essentially corollaries of one another. For example, in one approach, an availability metric can be calculated as a percent uptime based on a sum of downtimes. Table 1 provides a list of events which are obtained by the availability monitoring server from the central manager, for instance.

TABLE 1

Calculation of % uptime based on sum of downtimes

| C1 (row) Event type | C2 DB id: | C3 Event time | C4 Elapsed time (min.) | C5 # of DBs down | C6 Downtime for past interval (db-min) | C7 (S): Sum of downtimes (db-min) | C8 (P): Time period × # of DBs (100) (db-min) | C9 % uptime (1-S/P) × 100% |
|---|---|---|---|---|---|---|---|---|
| (1) | | Jan. 10, 2005 02:00 am | 0 | | | | | |
| (2) DB stop | A1 | Jan. 10, 2005 06:10 am | 250 | 1 | | | | |
| (3) DB stop | A2 | Jan. 10, 2005 06:50 am | 290 | 2 | 1 × 40 = 40 | | | |
| (4) DB start | A2 | Jan. 10, 2005 10:00 am | 480 | 1 | 2 × (480 − 290) = 380 | | | |
| (5) | A5 | Jan. 10, 2005 | 510 | 2 | 1 × (510 − 480) = 30 | | | |

TABLE 1-continued

Calculation of % uptime based on sum of downtimes

| C1 (row) Event type | C2 DB id: | C3 Event time | C4 Elapsed time (min.) | C5 # of DBs down | C6 Downtime for past interval (db-min) | C7 (S): Sum of downtimes (db-min) | C8 (P): Time period × # of DBs (100) (db-min) | C9 % uptime (1-S/P) × 100% |
|---|---|---|---|---|---|---|---|---|
| DB stop (6) DB start | A1 | 10:30 am Jan. 10, 2005 2:40 pm | 760 | 1 | 2 × (760 − 510) = 500 | | | |
| (7) DB start | A5 | 1/11/2005 01:00 am | 1380 | 0 620 | 1 × (1380 − 760) = | | | |
| (8) | | 1/11/2005 02:00 am | 1440 | 0 | 0 | 40 + 380 + 30 + 500 + 620 + 0 = 1570 | 144000 | (1 − 1570/144000) × 100% = 98.91% |

The first column (C1) indicates an event type, e.g., a database (DB) stop or start. The second column (C2) indicates an identifier of the database to which the event relates. Each database can be provided with an identifier which is unique by itself or in combination with another identifier, such as a storage group identifier or storage device identifier. The third column (C3) indicates a time the event was set. The information in C1-C3 includes the obtained event data, while the information in C4-C9 is calculated from the event data.

The fourth column (C4) indicates an elapsed time. Generally, the time period of interest for which the availability metric is determined can be set in different ways. For example, the time period can extend between fixed times during the day or week, which is the approach taken in Table 1. In another approach, the time period begins when an event is received, or at another specified time, and the availability metric is updated as a running total each time an additional event is received. Calculations can be performed to obtain an hourly metric or a weekly metric, for instance. Metrics for different time periods and/or different clusters or other groups of databases can also be aggregated to derive statistical measures such as an average, mean, standard deviation and so forth.

The elapsed time at row (1) in the fourth column is "0", indicating that this the start of the time period for which the metric will be calculated. The fifth column (C5) indicates the number of databases that are down. This can be provided by maintaining a counter that is incremented when an additional stop event is seen, and decremented when an additional start event is seen. The sixth column (C6) indicates the downtime for the past interval, e.g., in units of database-minutes. Other time units may be used as well. The seventh column (C7) indicates a sum (S) of the downtimes at the end of the time period. The eighth column (C8) indicates a product (P) of the time period and the total number of databases which are being monitored. Note that C8=C4×100 in the present example, assuming there are one hundred total databases monitored. The total number of databases monitored is a fixed value. C9 indicates the percent uptime for the time period as (1−S/P)× 100%.

Row (1) indicates that the time period begins at Jan. 10, 2005 02:00 am. The time period ends one day later at Jan. 11, 2005 02:00 am, as indicated by row (8). Row (2) indicates that a database stop event was received for a database "A1" at the time of Jan. 10, 2005 06:10 am, which represents an elapsed time of 250 minutes. A counter of the number of databases that are down is incremented to one in C5. Row (3) indicates that a database stop event was received for a database "A2" at the time of Jan. 10, 2005 06:50 am, which represents an elapsed time of 290 minutes. C5 is incremented again to indicate that there are now two databases down. Additionally, in C6, the downtime for the past interval is determined as 40 db-min since one database was down for 40 minutes.

Row (4) indicates that the database A2 has started again at Jan. 10, 2005 10:00 am, at 480 elapsed minutes. C5 is decremented again to indicate that there is now one database down, namely A1. In C6, the downtime for the past interval is determined as 380 db-min since two databases were down for 480−290=190 minutes. In row (5), a database A5 has stopped, at an elapsed time of 510 minutes, so C5 is incremented. In C6, the downtime for the past interval is determined as 30 db-min since one database was down for 510−480=30 minutes. In row (6), the database A1 has started again, at an elapsed time of 760 minutes, so C5 is decremented. In C6, the downtime for the past interval is determined as 500 db-min since two databases were down for 760−510=250 minutes. In row (7), the database A5 has started again, at an elapsed time of 1380 minutes, so C5 is decremented. In C6, the downtime for the past interval is determined as 620 db-min since one database was down for 1380−760=620 minutes.

In row (8), the end of the time period is reached, and the availability metric for the time period is calculated. In particular, in C7, the sum of the downtimes since the start of the time period is the sum of the values in C6, namely 1570 db-min. In C8, the product of the elapsed time (1440 minutes) and the total number of databases (100) is 144000 db-min. Note that an uptime of 144000 db-min. is therefore considered to be a perfect uptime record since it represents 100% availability of all databases during the time period. Finally, in C9, the percent uptime is determined (1−S/P)×100%=(1− 1570/144000)×100%=98.91%. The percent downtime can be obtained immediately from 100%−% uptime=100− 98.91=1.09% downtime.

In another possible approach, the availability metric can be calculated based on a sum of the uptimes of the databases rather than a sum of the downtimes. In this case, C5 provides the number of databases up, C6 provides the uptimes for the past interval, C7 provides the sum of the uptimes, and C9 provides the percent uptime as (S/P)×100%.

Also, as mentioned, a running total can be provided by filling in the appropriate values for columns C7-C9 for each row.

In yet another possible approach, the databases which are monitored are deemed to be of different relative importance. For example, a database that stores data for certain users who pay a premium fee, or which is part of a critical application, may be deemed to be relatively more important. In such cases, the availability metric can be weighted so that an unavailability of the relatively more critical databases impacts the availability metric more significantly. Table 2 provides an example calculation of a percent uptime based on sum of weighted downtimes. A corresponding calculation can be made based on a sum of uptimes as discussed above.

3820 db-min. In C8, the product of the elapsed time (1440 minutes) and the total weighted number of databases (103) is 148320 db-min. Note that an uptime of 148320 db-min. is therefore considered to be a perfect uptime record since it represents 100% availability of all databases during the time period. Finally, in C9, the weighted percent uptime is determined from $(1-S/P) \times 100\% = (1-3820/148320) \times$

TABLE 2

Calculation of weighted % uptime based on sum of weighted downtimes

| C1 (row) Event type | C2 DB id: | C3 Event time | C4 Elapsed time (min.) | C5 Weighted # of DBs down | C6 Weighted downtimes for past interval (db-min) | C7 (S): Sum of weighted downtimes (db-min) | C8 (P): Time period × weighted # of DBs (103) (db-min) | C9 Weighted % uptime (1-S/P) × 100% |
|---|---|---|---|---|---|---|---|---|
| (1) | | Jan. 10, 2005 02:00 am | 0 | | | | | |
| (2) DB stop | A1 | Jan. 10, 2005 06:10 am | 250 | 2 | | | | |
| (3) DB stop | A2 | Jan. 10, 2005 06:50 am | 290 | 3 | 2 × 40 = 80 | | | |
| (4) DB start | A2 | Jan. 10, 2005 10:00 am | 480 | 2 | 3 × (230 − 40) = 570 | | | |
| (5) DB stop | A5 | Jan. 10, 2005 10:30 am | 510 | 5 | 2 × (260 − 230) = 60 | | | |
| (6) DB start | A1 | Jan. 10, 2005 2:40 pm | 760 | 3 | 5 × (510 − 260) = 1250 | | | |
| (7) DB start | A5 | Jan. 11, 2005 01:00 am | 1380 | 0 | 3 × (1130 − 510) = 1860 | | | |
| (8) | | Jan. 11, 2005 02:00 am | 1440 | 0 | 0 | 80 + 570 + 60 + 1250 + 1860 = 3820 | 148320 | (1 − 3820/148320) × 100% = 97.42% |

In the example of Table 2, database A1 has a double weight, and database A5 has a triple weight. Note that the weights accorded the databases need not be integer weights. Database A2 has a unity weight.

Compared to Table 1, where all databases had a unity weight, C5-C9 differ. In particular, C5 provides the weighted number of databases that are down, C6 provides the weighted downtime for the past interval, C7 provides a sum of the weighted downtimes, C8 provides a product of the elapsed time and a weighted total number of databases, and C9 provides a weighted percent uptime. The weighted total number of databases is 103 since A1 and A5 count as five databases instead of two, due to the double and triple weights, so there are three additional databases counted beyond the previous value of 100 databases.

At row (2), the database A1, which has a weight of two, is down, so C5 indicates that two databases are down. At row (3), A2, which has a weight of one, goes down, so C5 indicates three databases down. C6 indicates a weighted downtime for the past interval of 2×40=80 db-min. instead of 1×40 because A2 has a double weight. In row (4), C5 is decremented by one because the database A2, with a weight of one, starts again. In row (5), C5 is incremented by three because the database A5, which has a triple weight, stops. In row (6), C5 is decremented by two because database A1, which has a double weight, starts again. In row (7), C5 is decremented by three because database A5, which has a triple weight, starts again.

In row (8), the end of the time period is reached, and the availability metric for the time period is calculated. In particular, in C7, the sum of the weighted downtimes since the start of the time period is the sum of the values in C6, namely 100%=97.42%. The percent downtime can be obtained immediately from 100%−% uptime=100−97.42=2.58% downtime.

Further, as mentioned, the availability of computer resources other than databases can similarly be determined. In particular, the availability of hardware and/or software resources can be determined by monitoring events which relate to the availability of such resources. For example, downtime and uptime of a storage component such as a hard disk or processor can be detected by the setting of corresponding events of a monitoring program. For a hard disk in an array of such disks, a "hard disk down" event and a "hard disk up" event for a specific hard disk can be used to determine availability. An identifier of the particular hard disk which experiences downtime can also be tracked, if available.

Figure 5:
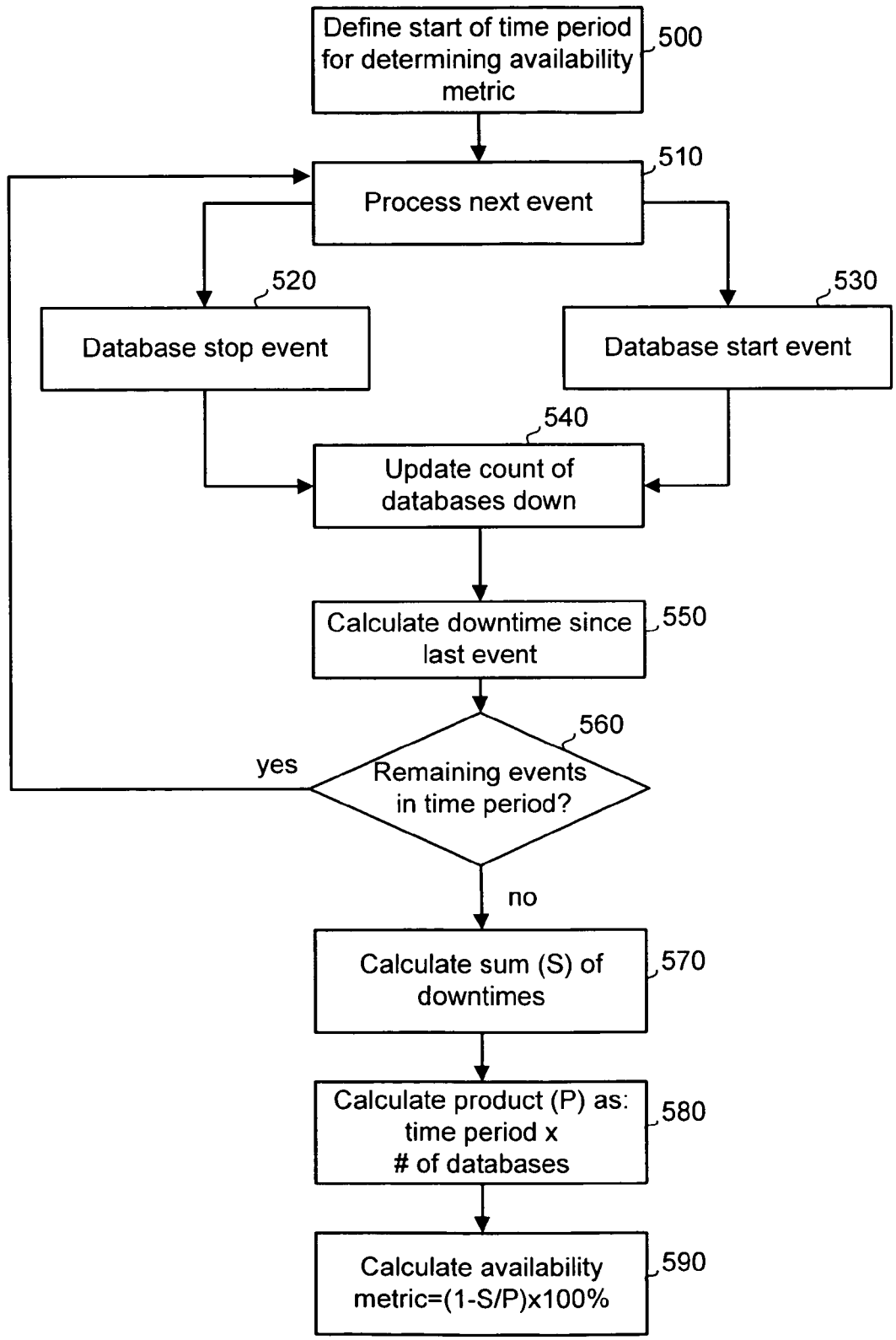
FIG. 5 illustrates a method for calculating an availability metric.

FIG. 5 illustrates a method for calculating an availability metric. The determination of an availability metric as presented in the tables above, particularly Table 1, can be summarized generally as follows. At step 500, a start of a time period for determining an availability metric is defined. At step 510, a next event in a list of events in Table 1, for instance, is processed. The event may be a database stop event (step 520) or a database start event (step 530), for instance. At step 540, the count of databases which are down is incremented or decremented depending on whether a stop or start event, respectively, was received. At step 550, the downtime since the last event for all databases is calculated. At decision block 560, if there are remaining events in the time period, a next event in Table 1, for instance, is processed at step 510. If there are no remaining events at decision block 560, a sum (S) of the downtimes is calculated at step 570. The sum can have units of database-minutes or similar. At step 580, a product (P) is determined based on the duration of the time period which started at step 500 and the total number of databases monitored, regardless of whether they were down or not. At step 590, an availability metric is determined from $(1-S/P) \times 100\%$, in one possible approach. The availability monitoring server can use any programming techniques to analyze the event data to obtain the availability metric. For example, simple scripts can be used.

Figure 6:
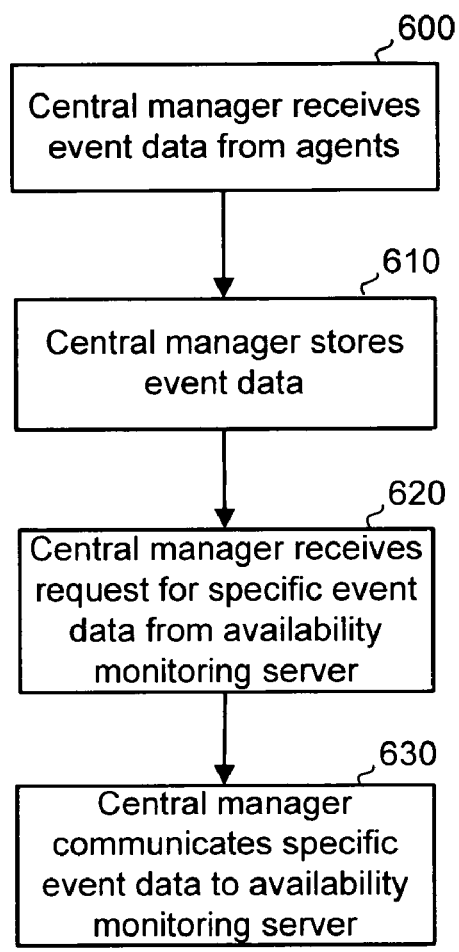
FIG. 6 illustrates a method for providing an availability metric, from the perspective of a central manager.

FIG. 6 illustrates a method for providing an availability metric, from the perspective of a central manager. At step 600, the central manager receives event data from the agents at the different storage devices. The agents capture event data at the respective storage devices and forward it to the central manager, in one approach. The event data can include all events which are set at the respective storage devices, including those relating to database availability. The event data can include a timestamp indicating the time/date when the event was set, an event identifier, an identifier of the storage device involved, and for database-related events, an identifier of the database involved. At step 610, the central manager stores the event data, such as in an a database. At step 620, the central manager receives a request for specific event data from the availability monitoring server. As mentioned, the availability monitoring server may request event data for events relating to database availability. The central manager can search the database using criteria including specific event identifiers that are specified by the availability monitoring server, as well as criteria specifying a particular time period of interest, and databases, storage groups, physical storage devices and/or clusters of interest. Generally, events relating to any hierarchical level can be obtained. Any type of searching/filtering program can be run at the central manager for this purpose. At step 630, once the central manager identifies the requested event data, it provides the event data to the availability monitoring server.

Figure 7:
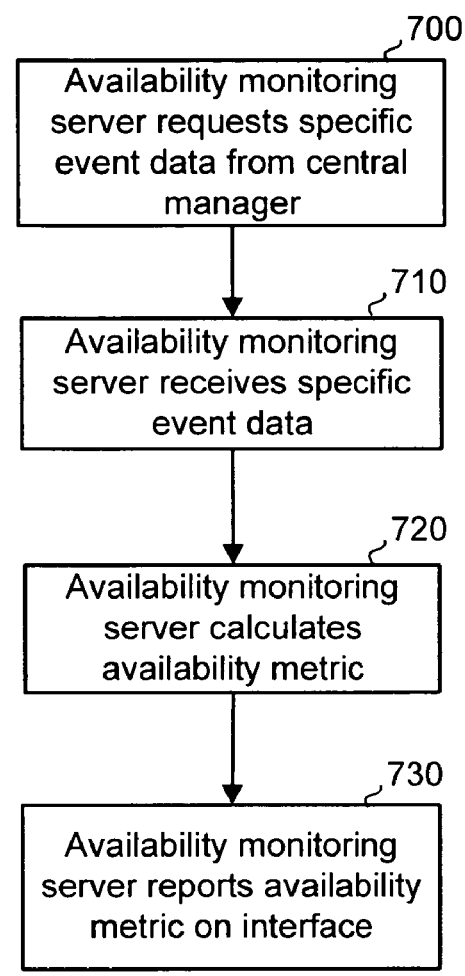
FIG. 7 illustrates a method for providing an availability metric, from the perspective of an availability monitoring server.

FIG. 7 illustrates a method for providing an availability metric, from the perspective of an availability monitoring server. At step 700, the availability monitoring server requests specific event data from the central manager, as discussed above. At step 710, the availability monitoring server receives the requested event data and, at step 720, calculates one or more availability metrics. At step 730, the availability monitoring server reports the one or more availability metrics via an interface, for instance, or stores the one or more metrics for subsequent reporting. By obtaining availability metric data over time, statistical techniques can be employed to set an appropriate service level agreement with a given degree of confidence. For example, a 10th percentile value may be used as a service level agreement. Consider an example where weekly availability metrics are calculated. Assume uptime values of 90%, 91%, 92%, 93%, 94%, 95%, 96%, 97%, 98% and 99% over ten weeks. An availability of 91% or higher, which was achieved in nine cases out of ten, represents the 10th percentile value, because one of the ten values is less than 91%, and can be set as the service level agreement. Or, the metric can be used a benchmark to gauge the reliability of the network, thereby providing IT personnel with a tangible performance measure. Other measures, such as a number of user complaints, can be tracked and correlated with the availability metric. In practice, reliability is often close to 100% and can be measured on a "9's" scale, e.g., 99%, 99.9%, 99.99% and so forth. 99.99% reliability translates to fifty minutes of downtime a year, while 99.999% reliability translates to five minutes of downtime a year. Most databases run at 99.9% or less.

The availability monitoring server can maintain a cluster map which identifies the arrangement of databases in one or more clusters. The cluster map identifies the cluster name, a list of physical servers, a list of virtual servers, and the associated storage groups and databases. The cluster map can be used to analyze the event data received from the cluster manager. For example, the cluster map allows the availability monitoring server to know how many total databases are in a cluster, and the identity of the databases in a cluster. Also, the cluster map can be used to formulate queries to the cluster manager. For example, a query may be formulated to obtain the event data for a given cluster or for specified databases in the cluster. Such a query may have the general form of: "provide all start and stop event data between time 1 and time 2 for cluster x", or "provide all start and stop event data between time 1 and time 2 for databases x, y, z . . . " The cluster map can be configured in the availability monitoring server by data provided by the central manager, for instance. The cluster map can similarly be updated as storage devices become active or inactive and databases are relocated, or as new storage devices and their databases are added, or existing storage devices and their databases are removed.

An example cluster map which uses an XML schema is provided below for cluster A (120) of FIG. 2. It is assumed that each of the storage devices has two storage groups, and each storage group has five databases. The cluster map indicates whether a physical storage device is also a virtual storage device. In particular storage devices D and E are inactive or passive physical storage devices, so there are no storage groups or databases to specify. Storage devices A, B and C are active physical storage devices. In the example provided, the database identifiers are not unique. In this case, a database can be identified uniquely by its identifier together with one or more higher level identifiers, such as a storage group, physical storage device and/or cluster identifier. Alternatively, the databases can be provided with unique identifiers.

```
<?xml version="1.0" encoding="utf-8"?>
<root>
<cluster name="Cluster A">
<server virtual="Virtual storage device A" physical="Physical storage device A">
<StorageGroup name="Storage group A">
<db name="A1" />
<db name="A2" />
<db name="A3" />
<db name="A4" />
<db name="A5" />
</StorageGroup>
<StorageGroup name="Storage group B">
<db name="B1" />
<db name="B2" />
<db name="B3" />
<db name="B4" />
<db name="B5" />
</StorageGroup>
</server>
<server virtual="Virtual storage device B" physical="Physical storage device B">
<StorageGroup name="Storage group A">
<db name="A1" />
<db name="A2" />
<db name="A3" />
<db name="A4" />
<db name="A5" />
</StorageGroup>
<StorageGroup name="Storage group B">
<db name="B1" />
<db name="B2" />
<db name="B3" />
<db name="B4" />
```

-continued

```
<db name="B5" />
</StorageGroup>
</server>
<server virtual="Virtual storage device C" physical="Physical storage device C">
<StorageGroup name="Storage group A">
<db name="A1" />
<db name="A2" />
<db name="A3" />
<db name="A4" />
<db name="A5" />
</StorageGroup>
<StorageGroup name="Storage group B">
<db name="B1" />
<db name="B2" />
<db name="B3" />
<db name="B4" />
<db name="B5" />
</StorageGroup>
</server>
<server physical="Physical storage device D" />
<server physical="Physical storage device E" />
</cluster>
```

Figure 8:
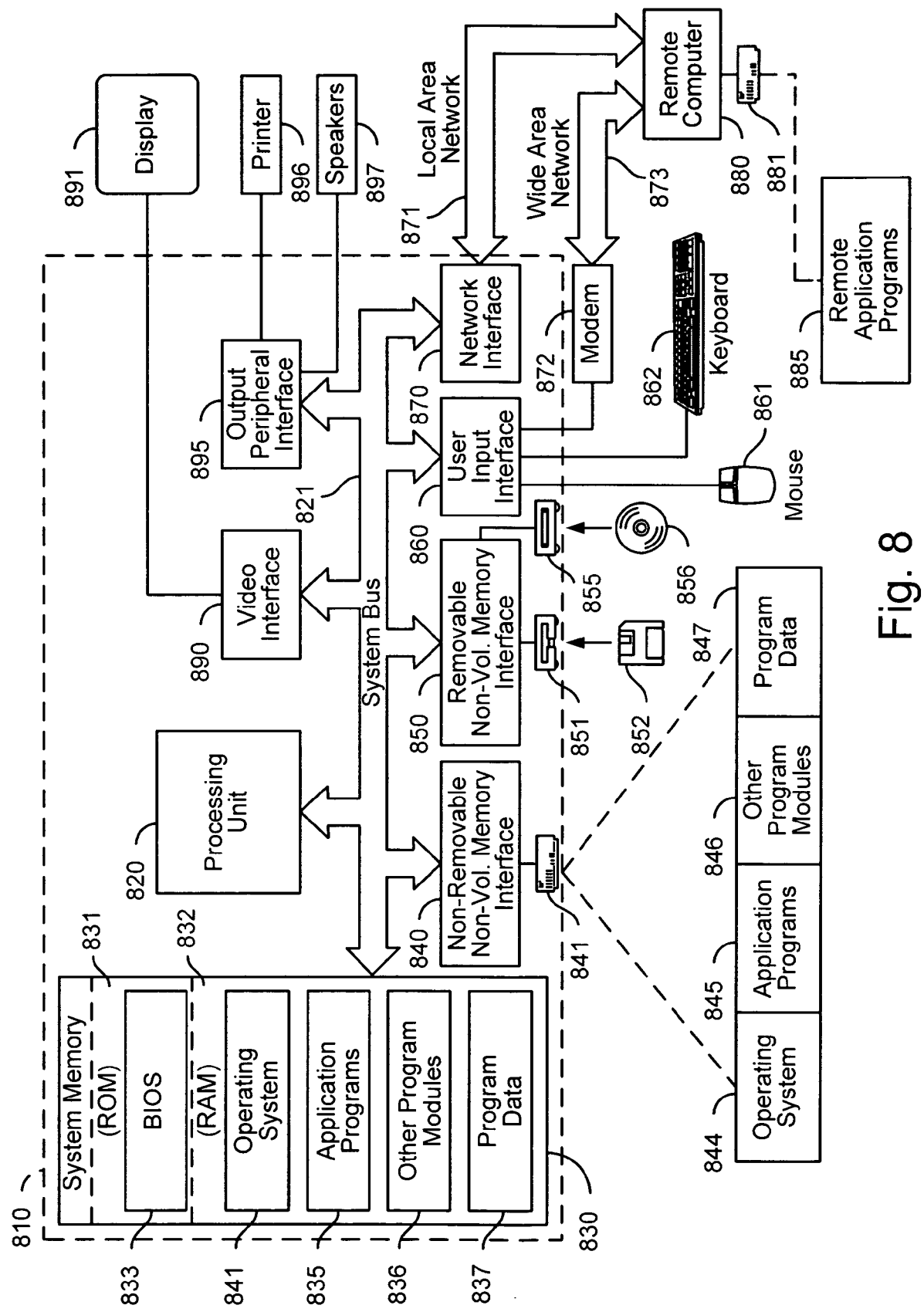
FIG. 8 is a block diagram of computer hardware suitable for implementing embodiments of the invention.

FIG. 8 is a block diagram of computer hardware suitable for implementing embodiments of the invention. An exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. For example, hard disk drive 841 is illustrated as storing operating system 844, application programs 845, other program modules 846, and program data 847. These components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated. The logical connections depicted include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A computer-implemented method for determining availability of computer resources, comprising:
   detecting events regarding availability of a number N of databases over a time period TP; and
   after the time period, based on the detected events, determining a metric M1 regarding the availability of the N databases over the time period TP according to: (a) a weighted sum S of associated downtimes or uptimes of individual databases of the N databases over the time period TP, where the N databases comprise: (i) databases which store user data for certain users who are deemed to have a relatively high importance due to payment of a premium fee, and (ii) databases which store user data for other users who are deemed to have a relatively low importance due to non-payment of the premium fee, and the weighted sum S is weighted such that the associated downtimes or uptimes of the databases which store the user data for the certain users who are deemed to have a relatively high importance impact the weighted sum S more heavily than the associated downtimes or uptimes of the databases which store the user data for the other users who are deemed to have a relatively low importance, and (b) a product P of the time period TP and a weighted number of databases; where:
   the metric M1=(1−S/P);
   a respective weight is assigned to each database, including a first weight which is assigned to the databases which store user data for the other users who are deemed to have the relatively low importance, and a weight greater than the first weight which is assigned to the databases which store the user data for the certain users who are deemed to have the relatively high importance; and
   the weighted number of databases is based on a sum of the respective weights assigned to the databases.

2. The computer-implemented method of claim 1, wherein:
   the time period includes intervals between the events, the events include at least one of an event which indicates a database down condition and an event which indicates a database up condition;
   the method further comprising:
   determining a duration of each interval;
   determining a weighted number of databases down in each interval;
   determining a weighted downtime for each interval based on a product of the weighted number of databases down in the interval and the duration of the interval; and
   determining the weighted sum S as a sum of the weighted downtimes.

3. The computer-implemented method of claim 2, further comprising:
   determining whether the event which indicates a database down condition is set by determining whether one or more of a first event is set which indicates a database has stopped and a second event is set which indicates that a cluster in which a database is provided is attempting to offline a resource.

4. The computer-implemented method of claim 1, wherein:
   the obtaining the information comprises querying a central manager which has received the information from at least one agent associated with the N databases.

5. The computer-implemented method of claim 1, wherein:
   the N of databases comprise databases which are provided in a common storage device, and the metric M1 is determined for the common storage device.

6. The computer-implemented method of claim 1, further comprising:
   determining a percentage-based metric M2 regarding the availability of the N databases as M2=(1−S/P)×100%.

7. The computer-implemented method of claim 1, wherein:
   the events identify each database of the N databases that experiences downtime during the time period, including at least two databases that experience downtime during the time period in a common storage device.

8. The computer-implemented method of claim 1, wherein:
   the N databases are located at a plurality of different storage devices, including at least two databases located at one of the plurality of different storage devices, and the metric M1 is determined for each of the at least two databases at the one of the plurality of different storage devices.

9. The computer-implemented method of claim 8, wherein:
   the events are obtained by agents associated with the different storage devices and communicated to a central manager.

10. The computer-implemented method of claim 1, wherein:
    the N databases are provided in a plurality of different clusters, each of the different clusters including a plurality of storage devices on which the plurality of computer resources are provided, and the metric is determined separately for each of the different clusters.

11. A computer-implemented method for determining availability of computer resources, comprising:
    obtaining information regarding availability, over a time period, of computer resources including databases, the databases are arranged in a plurality of clusters, where the databases comprise: (i) databases which store user data for certain users who are deemed to have a relatively high importance due to payment of a premium fee, and (ii) databases which store user data for other users who are deemed to have a relatively low importance due to non-payment of the premium fee;

accessing a cluster map which defines an arrangement of databases in one or more clusters, the cluster map identifies, for each cluster, a cluster name, a list of physical servers in the cluster, a list of virtual servers in the cluster, storage groups of each physical server and virtual server, and databases of each storage group; and based on the obtained information and the cluster map, determining, for each cluster, after the time period, a metric M1 regarding the availability of the computer resources over the time period; wherein:

for each cluster, the metric M1 is determined according to: (a) a weighted sum S of associated downtimes or uptimes of the databases in the cluster over a time period and (b) a product P of the time period and a weighted number N of the databases, where M1=(1−S/P), and the weighted sum S is weighted such that the associated downtimes or uptimes of the databases which store the user data for the certain users who are deemed to have a relatively high importance impact the weighted sum S more heavily than the associated downtimes or uptimes of the databases which store the user data for the other users who are deemed to have a relatively low importance; and the time period includes intervals between events, the events include at least one of an event which indicates a database down condition and an event which indicates a database up condition;

the method further comprising:
determining a duration of each interval;
determining a weighted number of computer resources down in each interval;
determining a weighted downtime for each interval based on a product of the weighted number of computer resources down in the interval and the duration of the interval; and
determining the weighted sum S as a sum of the weighted downtimes.

12. The computer-implemented method of claim 11, further comprising:
determining a percentage-based metric M2 regarding the availability of the computer resources as M2=(1−S/P)× 100%.

13. The computer-implemented method of claim 11, wherein:
the events are set by at least one of an operating system and an application associated with each of the individual clusters.

14. The computer-implemented method of claim 11, wherein:
the obtaining the information comprises querying a central manager which has received the information from agents associated with the individual clusters.

15. The computer-implemented method of claim 11, wherein:

the plurality of computer resources comprise databases for which downtime or uptime is tracked, including a plurality of databases which are arranged in one of the storage groups.

16. Computer readable storage device having computer readable code embodied thereon for programming at least one processor to perform a method for determining availability of computer resources, the method comprising:

analyzing event data over a time period TP to determine whether: (a) first event data is set that indicates when individual computer resources of a plurality of computer resources have stopped, (b) second event data is set that indicates when a cluster is attempting to offline one of the computer resources, and (c) third event data is set that indicates when individual computer resources of the plurality of computer resources have started;

wherein the pluarlity of computer resources include: (i) computer resources which store user data for certain users who are deemed to have a relatively high importance due to payment of a premium fee, and (ii) computer resources which store user data for other users who are deemed to have a relatively low importance due to non-payment of the premium fee;

wherein an individual computer resource is considered to be down when the first or second event data is set, and an individual computer resource is considered to be up when the third event data is set; and after the time period TP, based on the event data, determining a metric M regarding the availability of the plurality of computer resources according to a ratio of: (a) a weighted sum S of associated downtimes or uptimes of individual computer resources in the plurality of computer resources over the time period TP, and (b) a product P of the time period TP and a number N of the individual computer resources in the plurality of computer resources, where P=TP×N, M=(1−; and the weighted sum S is weighted such that the associated downtimes or uptimes of the computer resources which store the user data for the certain users who are deemed to have a relatively high importance impact the weighted sum S more heavily than the associated downtimes or uptimes of the computer resources which store the user data for the other users who are deemed to have a relatively low importance.

17. The computer readable storage device of claim 16, wherein:
a plurality of the databases are arranged in one storage device.

18. The computer-implemented method of claim 1, further comprising:
storing the metric M1; and
reporting the metric M1 via a user interface.

19. The computer-implemented method of claim 1, wherein:
the user data for the certain users who are deemed to have a relatively high importance, and the user data for the other users who are deemed to have a relatively low importance, comprise text of sent and received e-mail messages of email accounts.

* * * * *